United States Patent [19]

Syobatake et al.

[11] Patent Number: 5,083,269
[45] Date of Patent: Jan. 21, 1992

[54] BUFFER DEVICE SUITABLE FOR ASYNCHRONOUS TRANSFER MODE COMMUNICATION

[75] Inventors: Yasuro Syobatake; Yoshinari Kumaki, both of Yokohama, Japan

[73] Assignee: Kabushiki Kaisha Toshiba, Kawasaki, Japan

[21] Appl. No.: 462,118

[22] Filed: Jan. 8, 1990

[30] Foreign Application Priority Data

Jan. 10, 1989 [JP] Japan .................................. 1-3566

[51] Int. Cl.$^5$ .................... G06F 3/00; G06F 7/36; G11C 7/00
[52] U.S. Cl. ........................ 395/425; 365/189.05; 365/189.12; 365/221; 364/DIG. 1
[58] Field of Search ............... 364/200, 900; 365/189.01, 189.05, 189.04, 230.05, 189.12, 73, 78, 221

[56] References Cited

U.S. PATENT DOCUMENTS

| | | | |
|---|---|---|---|
| 4,751,675 | 6/1988 | Knauer | 365/221 |
| 4,833,655 | 5/1989 | Wolf et al. | 365/221 |
| 4,839,866 | 6/1989 | Ward et al. | 365/221 |

OTHER PUBLICATIONS

Yuval Tamir et al., "High-Performance Multi-Queue Buffers for VLSI Communication Switches", Proceeding of International Conference on Computer Architecture '88, May 30–Jun. 2, 1988, pp. 343–354.

Primary Examiner—Alyssa H. Bowlep
Attorney, Agent, or Firm—Foley & Lardner

[57] ABSTRACT

A buffer device capable of dealing with multiple priority levels in which the efficiency of the memory capacity utilization can be improved such that the priority levels can be handled at the higher efficiency with smaller memory capacities, and which is adaptable to a high speed buffer implementation. The device includes a data register array containing empty data registers and imaginary FIFO queues, and an adminstrative register array comprised of a two port RAM for storing pointer chains specifying the imaginary FIFO queues. The input of data is accompanied by the modification of the pointer chain to extend it, whereas the output of data is accompanied by the modification of the pointer chain to shorten it, so that the imaginary FIFO queues are administered in flexible manner in order to achieve efficient memory capacity utilization. The procedure for controlling the imaginary FIFO queues can be executed in parallel because of the independency of read and write operations in the two port RAM.

4 Claims, 18 Drawing Sheets

FIG.1

BUFFER DEVICE SUITABLE FOR ASYNCHRONOUS TRANSFER MODE COMMUNICATION

BACKGROUND OF THE INVENTION

1. Field of the Invention

The present invention relates to a buffer device which is particularly suitable for ATM(asynchronous transfer mode) communication system.

2. Description of the Background Art

Recently, much attentions have been paid to ATM in which information transfer capacities of a communication network are utilized in accordance with requests from communication terminals, as oppose to STM(synchronous transfer mode) in which the information transfer capacities necessary for communications are reserved in advance.

In ATM, information is transferred in terms of short packets of fixed lengths called cells, and the information transfer capacities of the communication network are utilized by each communication terminal by sending the cells to the communication network whenever a need arises.

Compared with STM, ATM possesses advantages of being capable to provide an appropriate information transfer speed required by an individual communication terminal, and also to improve a communication efficiency because of the fact that the information transfer capacities of the communication network are utilized in accordance with requests from the communication terminals.

For this reason, ATM is considered to be a fundamental technique in constructing B-ISDN(broadband-integrated services digital network) system in which information in diverse forms such as audio signals, visual signals, and computer data can be handled in a single unified manner.

As mentioned above, in a communication system utilizing ATM, the information transfer capacities of a communication network are utilized in accordance with requests from the communication terminals. From a point of view of the communication network, this means the communication terminals are sharing communication paths in a demand-driven manner.

Now, for any system, not necessarily limited to the communication system with ATM, in which some kind of resources are shared in a demand-driven manner by terminals, buffer devices are indispensable.

Such a buffer device must be equipped with an ability to temporarily store a number of request data representing requests from different terminals, such as cells in the communication system with ATM, so as to be able to handle plurality of requests to utilize a single resource in order.

This temporary storage ability is usually realized by employing a so called FIFO (First In First Out) buffer in which request data arrived first goes out first, such that the earliest request to utilize the resource will be given a priority over the subsequent requests.

Here, however, when there are certain requests which should be given a higher priority than other requests, such FIFO buffer is obviously inadequate.

In such a case, it is necessary to have priority order established, accompany each request data with priority information indicating priority level of the request, and control the buffer output such that the request data with the highest priority goes out first.

Conventionally, this is achieved by providing separate FIFO buffers for each priority levels, such that the request data with the highest priority which arrived first among all the request data with the highest priority goes out first.

In such a conventional buffer structure, when one FIFO buffer for a particular priority level becomes full, subsequent request data with that priority level will be disregarded. Thus, when the request data for a particular priority data, a memory capacities of the entire buffer structure will be utilized at low efficiency, because a large number of the request data with that particular priority level will be disregarded while the memory capacities for the other priority levels are still available.

To cope with such a problem, there has been a proposition of a multi-queue buffers by Y. Tamir and G. L. Frazier in "High-Performance Multi-Queue Buffers for VLSI Communication Switch", Proceeding of International Conference on Computer Architecture '88, May 30–June 2, 1988.

However, in their multi-queue buffers, link-lists were utilized in realizing the multi-queue, so that it has been difficult to adapt their multi-queue buffers to a high speed buffer implementation.

SUMMARY OF THE INVENTION

It is therefore an object of the present invention to provide a buffer device capable of dealing with multiple priority levels in which the efficiency of the memory capacity utilization can be improved such that the priority levels can be handled at the higher efficiency with smaller memory capacities, and which is adaptable to a high speed buffer implementation.

This object is achieved in the present invention by providing a buffer device for receiving, temporarily storing and transmitting data accompanied by information indicating a priority level of the data, where there is at least two distinct priority levels, the device comprising: data register array including a plurality of data register means for temporarily storing the data, the data register means being divided into empty data register means storing no data and as many number of imaginary FIFO queues as a number of distinct priority levels, each imaginary FIFO queue being corresponding to each distinct priority level, and a number of data register means in each imaginary FIFO queue being flexible; administrative register array comprised of a two port RAM means for modifiably storing the administrative information containing pointer chains specifying the imaginary FIFO queues in the data register array, having a write-in port through which the administrative information can be written into the administrative register array and a read-out port through which the administrative information can be read out from the administrative register array which are independently operable; data input means for receiving new data, entering the new data into one empty data register means, and modifying the pointer chain specifying the imaginary FIFO queue corresponding to a priority level of the new data indicated by the information accompanying the new data, such that the pointer chain is extended to include that one empty data register means into which the new data is entered at an end of that imaginary FIFO queue; and data output means for taking out data stored in one data register means, transmitting the data, and modifying the pointer chain specifying the imaginary FIFO queue corresponding to a priority level of that data, such that the pointer chain is shortened to exclude that one data register means from which the data is taken from a top of that imaginary FIFO queue.

Other features and advantages of the present invention will become apparent from the following description taken in conjunction with the accompanying drawings.

DETAILED DESCRIPTION OF THE PREFERRED EMBODIMENTS

Figure 1:
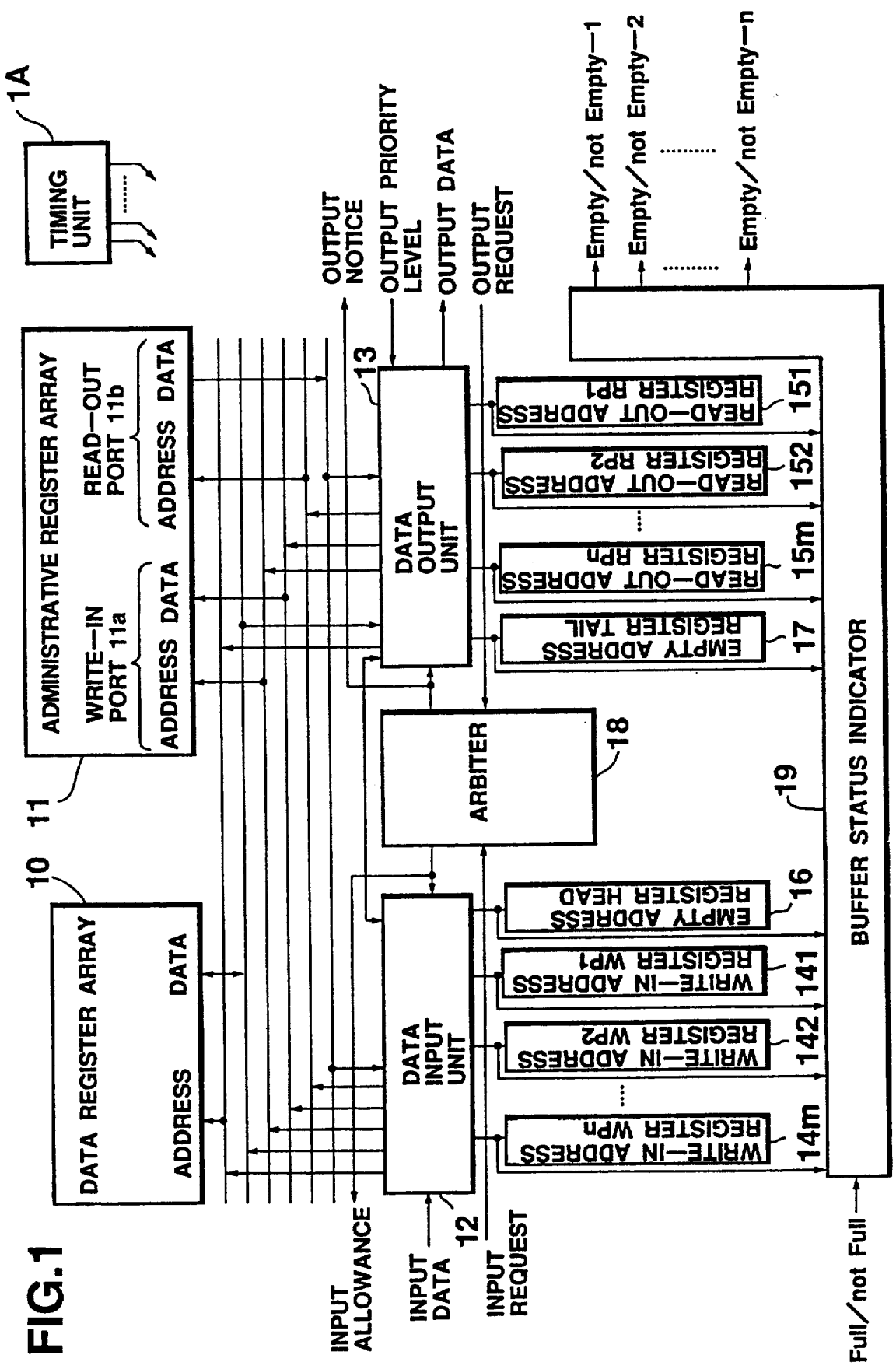
FIG. 1 is a block diagram of one embodiment of a buffer device according to the present invention.

Referring now to FIG. 1, there is shown one embodiment of a buffer device according to the present invention.

In this embodiment, the buffer device comprises a data register array 10 for temporarily storing incoming input data, an administrative register array 11 for storing information concerning administration of input and output of data in the data register array 10, a data input unit 12 for receiving input data and entering the input data into the data register array 10, a data output unit 13 for taking output data from the data register array 10 and transmitting the output data, write-in address registers 141-14$m$ for indicating addresses in the data register array 10 for the writing of new data, read-out address register 151-15$m$ for indicating addresses in the data register array 10 for reading of data, an empty address register head 16 for indicating a top of empty data registers, an empty address register tail 17 for indicating an end of the empty data registers, an arbiter 18 for arbitrating conflicting requests, a buffer status indicator 19 for indicating fullness of data in the data register array 10, and a timing unit 1A for generating timing sequences for other elements of the buffer device.

In this buffer device, incoming input data are received upon request by the data input unit 12 and are written in the data register array 10 for temporarily storing data, and also outgoing output data are send out from the data output unit 13 upon request by reading out the data in the data register array.

The data register array 10 needs to be able to read and write with respect to data registers provided within in correspondence with addresses used by the data input unit 12 and data output unit 13, which can be realized by employing a semiconductor random access memory IC manufactured by using LSI technology.

The administrative register array 11 is made of a two port RAM having m administrative registers (not shown in FIG. 1) for storing administrative information data as well as binary bit patterns indicating priority levels of the data stored in the corresponding addresses in the data register array 10, a write-in port 11$a$ for writing data into the administrative registers, and a read-out port 11$b$ for reading data out from the administrative registers.

Figure 2:
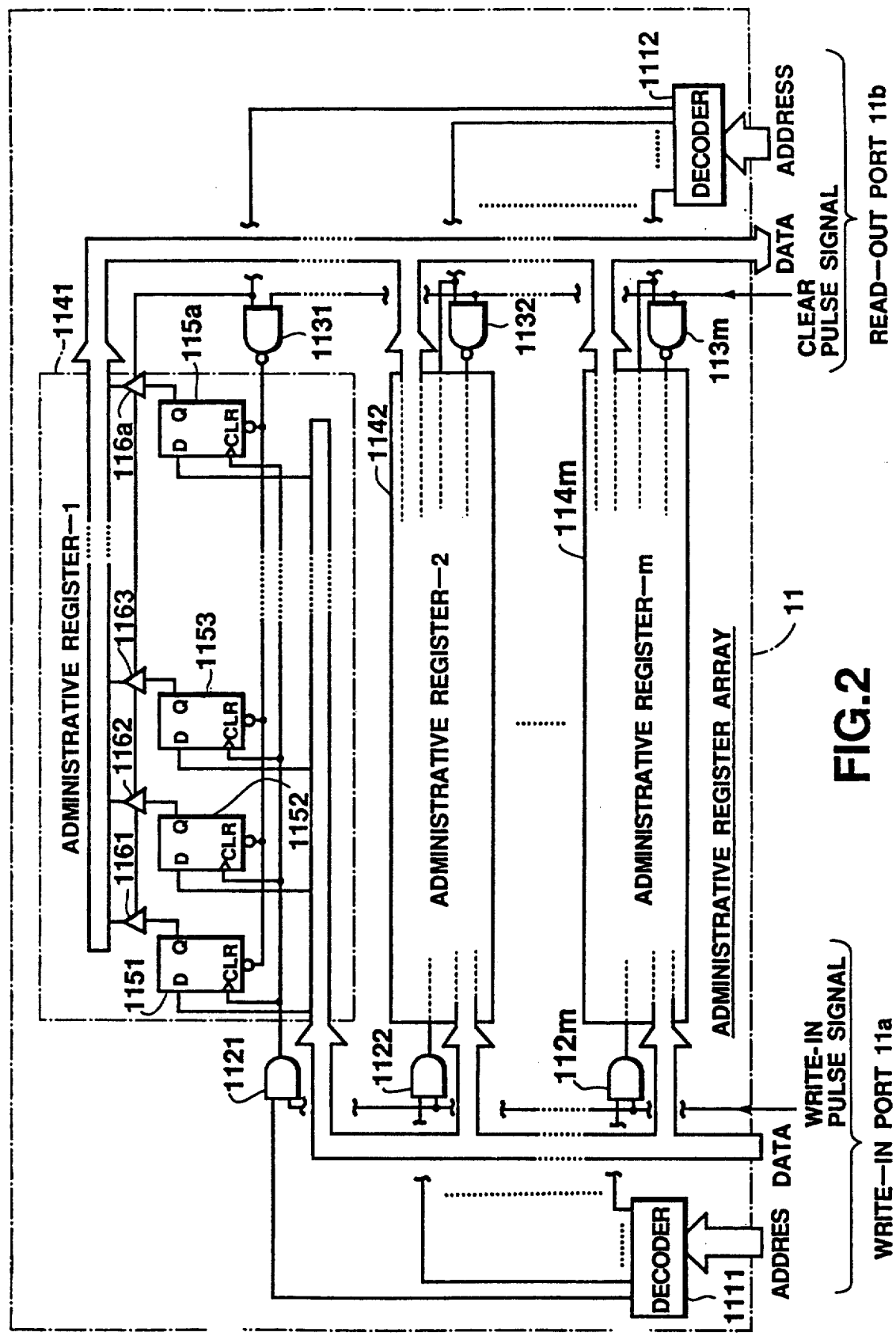
FIG. 2 is a detailed block diagram of an administrative register array of the buffer device of FIG. 1.

In further detail, this administrative register array 11 in this embodiment has a configuration shown in FIG. 2.

Namely, at the write-in port 11$a$, there is a decoder 1111 for decoding address entering to the write-in port 11$a$ in order to select an appropriate administrative register to write the administrative information data in from the administrative registers 1141-114$m$.

Each of the administrative registers 1141-114$m$ are associated on the write-in port 11$a$ side with AND gates 1121-112$m$ for providing a write-in pulse signal for effectuating the storing of the bit pattern to the appropriate administrative register selected by the decoder 1111.

On the other hand, at the read-out port 11b, there is another decoder 1112 for decoding address entering to the read-out port 11b in order to select an appropriate administrative register to read the administrative information data out from the administrative registers 1141-114m.

Each of the administrative registers 1141-114m are associated on the read-out port 11b side with NAND gates 1131-113m for providing a clear pulse signal for clearing the bit pattern in the pertinent administrative register selected by the decoder 1111.

Each of the administrative registers 1141-114m also has a plurality of D-type flip flops 1151-115a each of which stores one bit of the bit pattern, and a plurality of 3-state buffers 1161-116a for activating output of the administrative information data stored in that administrative register.

The data input unit 12 receives the input data only when an input allowance is given by the arbiter 18, and write the data in the data register array 10 at an address indicated by a bit pattern stored in an empty address register head 16.

In addition, the data input unit 12 updates the administrative information stored in the administrative registers 1141-114m in the administrative register array 11, through the write-in port 11a and the read-out port 11b, by utilizing the empty address register head 16 and one of write-in address registers 141-14m which is selected in accordance with some predetermined bits of the bit pattern of the input data which indicates the priority level of that input data.

The data output unit 13 reads out the data stored in the data register array 10 at an address specified by a bit pattern stored in one of read-out address registers 151-15m which is selected in accordance with a bit pattern given externally which indicates the priority level of the output data, and send the data out as the output data, only when an output notice is given by the arbiter 18.

In addition, the data output unit 13 updates the administrative information stored in the administrative registers 1141-114m in the administrative register array 11, through the write-in port 11a and the read-out port 11b, by utilizing the empty address register tail 17 and one of read-out address registers 151-15m which is selected in accordance with a bit pattern given externally which indicates the priority level of the output data, as before.

The arbiter 18 arbitrates conflicting requests when an input request and an output request occurred simultaneously by selecting one of the input request and the output request. In the following description of this embodiment, it is assumed that the output request is always given a higher priority than the input request, though this can be reversed if desired.

The buffer status indicator 19 gives out a buffer full signal for indicating whether the buffer device has any memory capacity for accepting new data available, by comparing the bit patterns stored in the empty Address register head 16 and empty address register tail 17.

In addition, the buffer status indicator 19 gives out buffer empty signal for indicating whether there is any data for output in each of imaginary FIFO queues formed inside the data register array 10 in correspondence with each priority level, by comparing the bit patterns stored in each one of the write-in address registers 141-14m corresponding to each priority level and each one of the read-out address registers 151-15m corresponding to each priority level.

The timing unit 1A provides pulse sequences indicating timings necessary to activate elements of the buffer device such as the write-in pulse signal and the clear pulse signal utilized in the administrative register array 11 described above.

Figure 3:
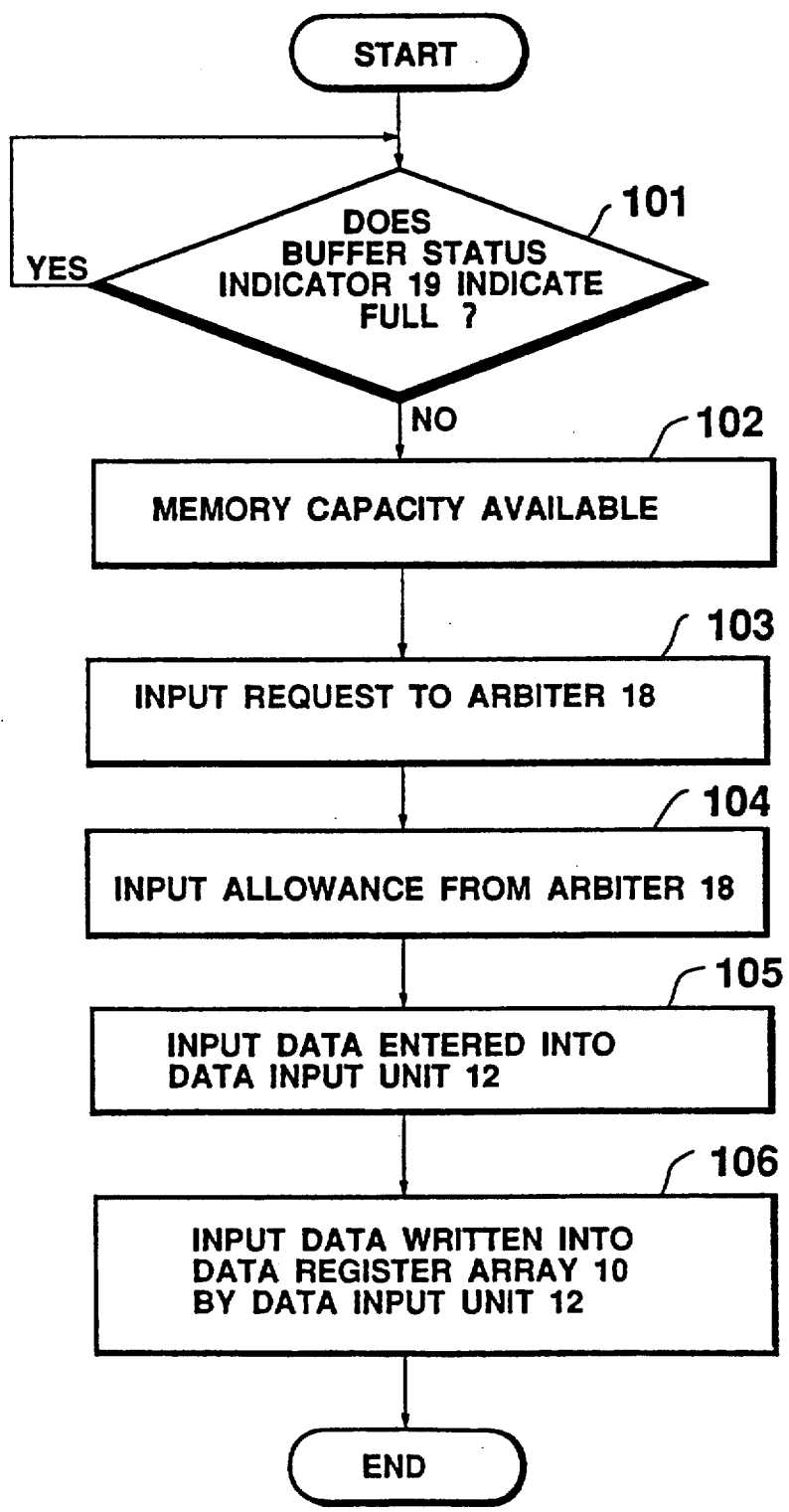
FIG. 3 is a flow chart for the input of input data in the buffer device of FIG. 1.

In this embodiment, the input data are entered into the buffer device in accordance with the flow chart of FIG. 3, as follows. Namely, first whether the buffer full signal from the buffer status indicator 19 indicates full or not full is determined(step 101). If full, the input of the input data is postponed until the buffer full signal changes to not full. Otherwise, the memory capacity for accepting new data is available(step 102) so that the input request is given to the arbiter 18(step 103). Only when the input allowance is given from the arbiter 18(step 104), the input data are entered into the data input unit 12(step 105) and then the input data are written into the data register array 10 by the data input unit 12(step 106), which completes the input of the input data.

Figure 4:
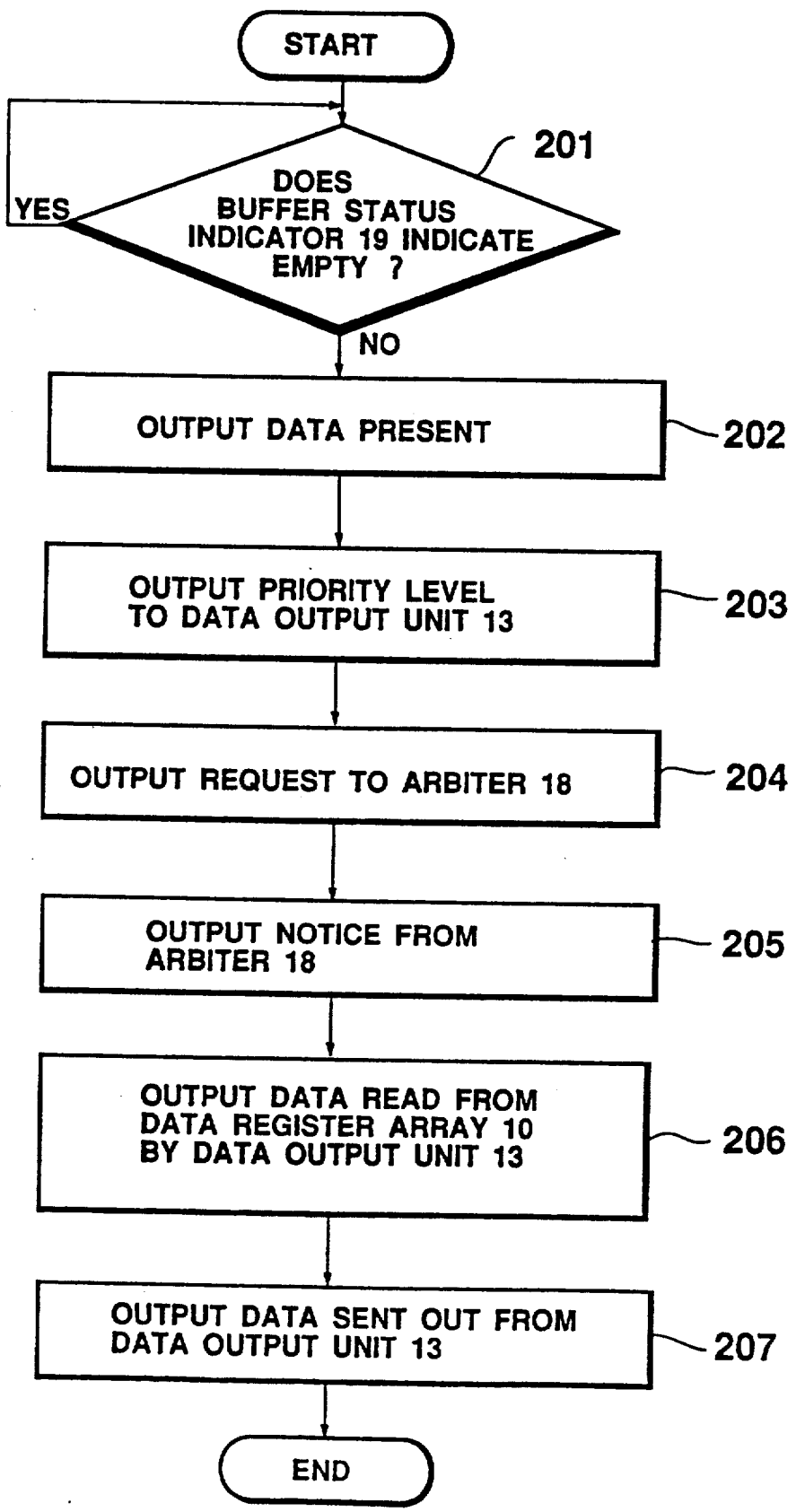
FIG. 4 is a flow chart for the output of output data in the buffer device of FIG. 1.

Also, in this embodiment, the output data are sent out from the buffer device in accordance with the flow chart of FIG. 4, as follows. Namely, first whether the buffer empty signal from the buffer status indicator 19 corresponding to the imaginary FIFO queue for a desired priority level for next output data indicates empty or not empty is determined(step 201). If empty, the output of the output data is postponed until the buffer empty signal changes to not empty. Otherwise, the data to be output data are present(step 202) so that the output priority level is given to the data output unit 13(step 203) and the output request is given to the arbiter 18(step 204). Only when the output notice is given from the arbiter 18(step 205), the output data are read from the data register array 10 by the data output unit 13(step 206) and then the output data are sent out from the data output unit 13(step 207), which completes the output of the output data.

Referring now to FIGS. 5 to 18, a manner of setting up imaginary FIFO queues in the data register array 10 in this embodiment will be explained in detail.

In FIGS. 5 to 18, HEAD stands for the empty address register head 16, TAIL stands for the empty address register tail 17, RP1 stands for the read-out address register 151, RP2 stands for the write-in address register 152, WP1 stands for the write-in address register 141, WP2 stands for the write-in address register 142. In addition, a data register having a certain address in the data register array 10 and a corresponding administrative register having the same certain address in the administrative register array 11 are depicted as a pair, and arrows joining the administrative registers represents pointer chains established between the administrative registers.

Each of the administrative registers, read-out address registers, write-in address registers, empty address register head, and empty address register tail has a capacity for storing an address associated with each data register, so as to furnish a function of pointer.

An address consisting binary zeros alone is reserved for an indication of the absence of the pair of data register and administrative register to point to, and is represented by a slash in a box for administrative registers, read-out address registers, write-in address registers, empty address register head, and empty address register tail.

Here, for the sake of simplicity, the explanation will be given for a case involving only two pairs of read-out register and two write-in register in which two imaginary FIFO queues are to be constructed on the data register array 10, in which case there are two sets of pointer chains provided.

Figure 5:
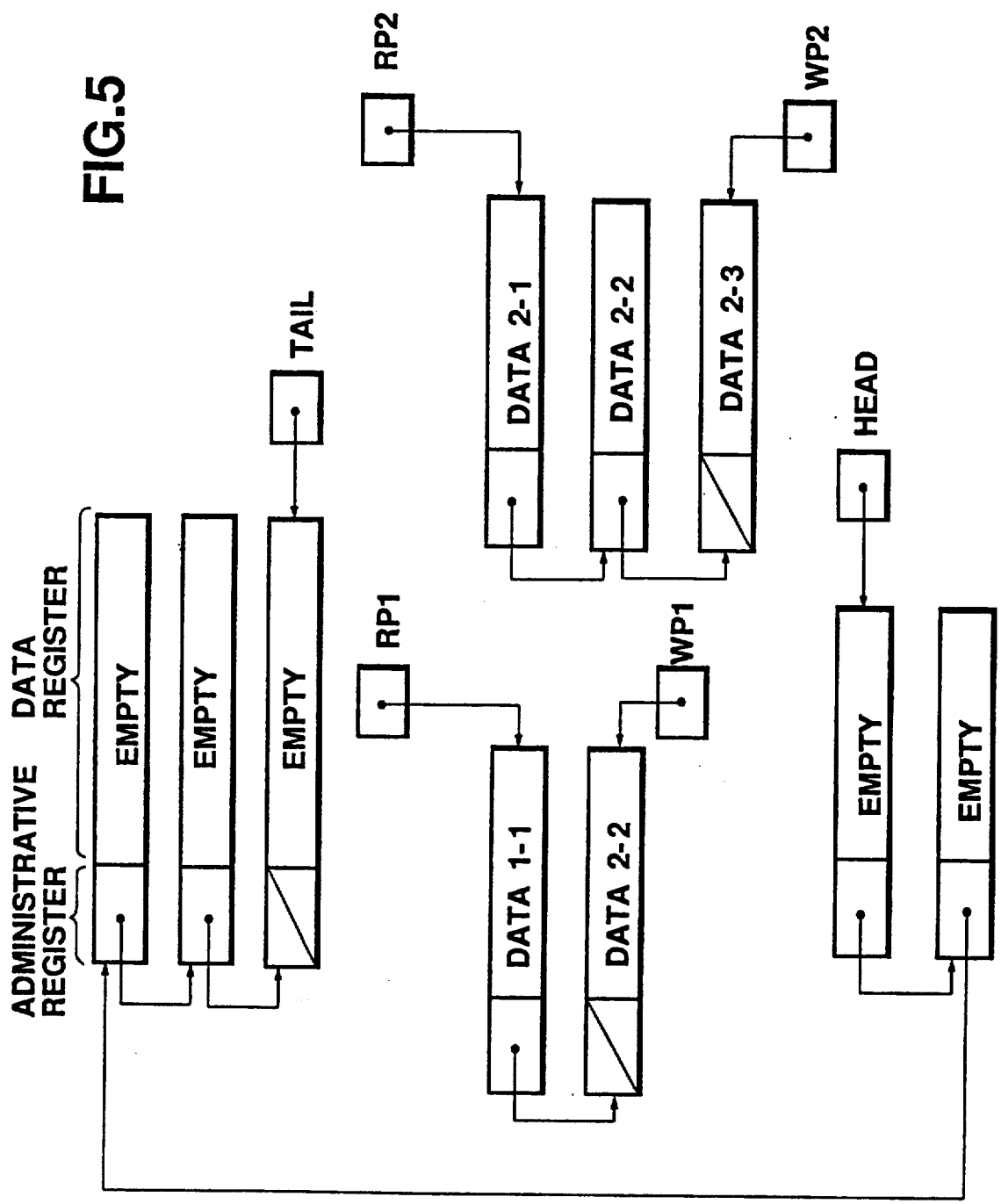
FIG. 5 is a diagram showing imaginary FIFO queues, empty data registers, and pointer chains in the buffer device of FIG. 1 for explaining their functions.

FIG. 5 shows a state of the buffer device diagrammatically. Two imaginary FIFO queues are represented by boxes joined by two pointer chains starting from the read-out registers RP1 and RP2, and the last data register and administrative register pairs of the imaginary FIFO queues each of which has a slash in a box for the administrative register are pointed by the write-in registers WP1 and WP2. The administrative registers associated with the empty data registers are also joined by a pointer chain which starts from the empty address register head HEAD and ends at the empty address register tail TAIL.

Figure 6:
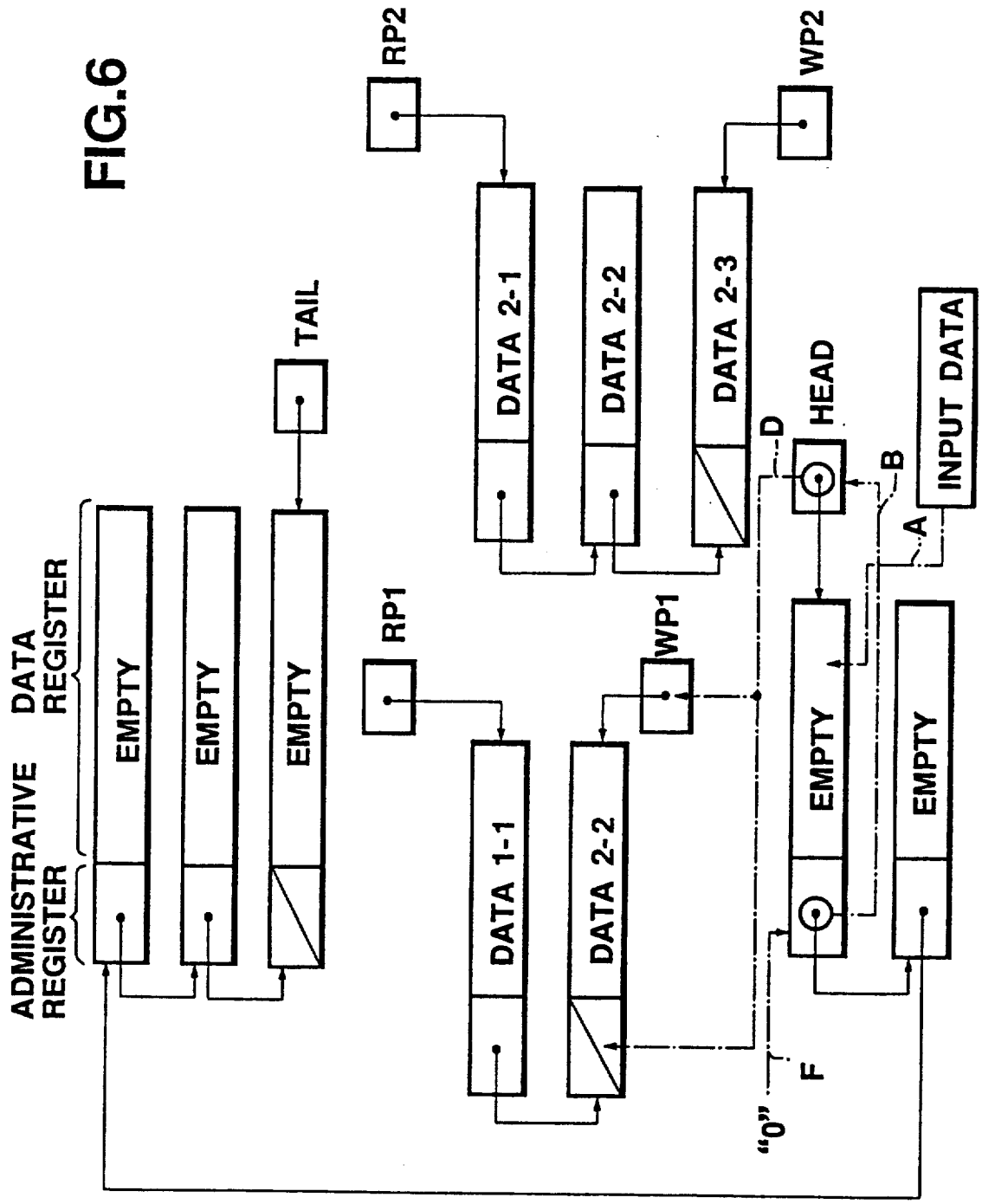
FIG. 6 is a diagram showing imaginary FIFO queues, empty data registers, and pointer chains in the buffer device of FIG. 1 for explaining their functions in the input of new data for a general case.

FIG. 6 shows a situation of the input of new input data to the state of FIG. 5, which is done in the following sequence.

First, the new input data are entered into the data register pointed by the empty address register head HEAD, indicated by a chain line A in FIG. 6.

Then, the address stored in the administrative register associated with that data register to which the new input data has been entered is transferred to the empty address register head HEAD, as indicated by a chain line B in FIG. 6.

Meanwhile, the original address stored in the empty address register head HEAD is transferred to the write-in address register WP1 which is selected in accordance with the priority level of the input data, as well as to the administrative register pointed by that write-in address register WP1, as indicated by a chain line D in FIG. 6.

Finally, the address consisting of binary zeros alone is entered into the administrative register associated with the data register to which the new input data has been entered, as indicated by a chain line F in FIG. 6, so that this pair of the administrative register and data register becomes the end of the pointer chain for this imaginary FIFO queue starting from the read-out address register RP1.

Figure 7:
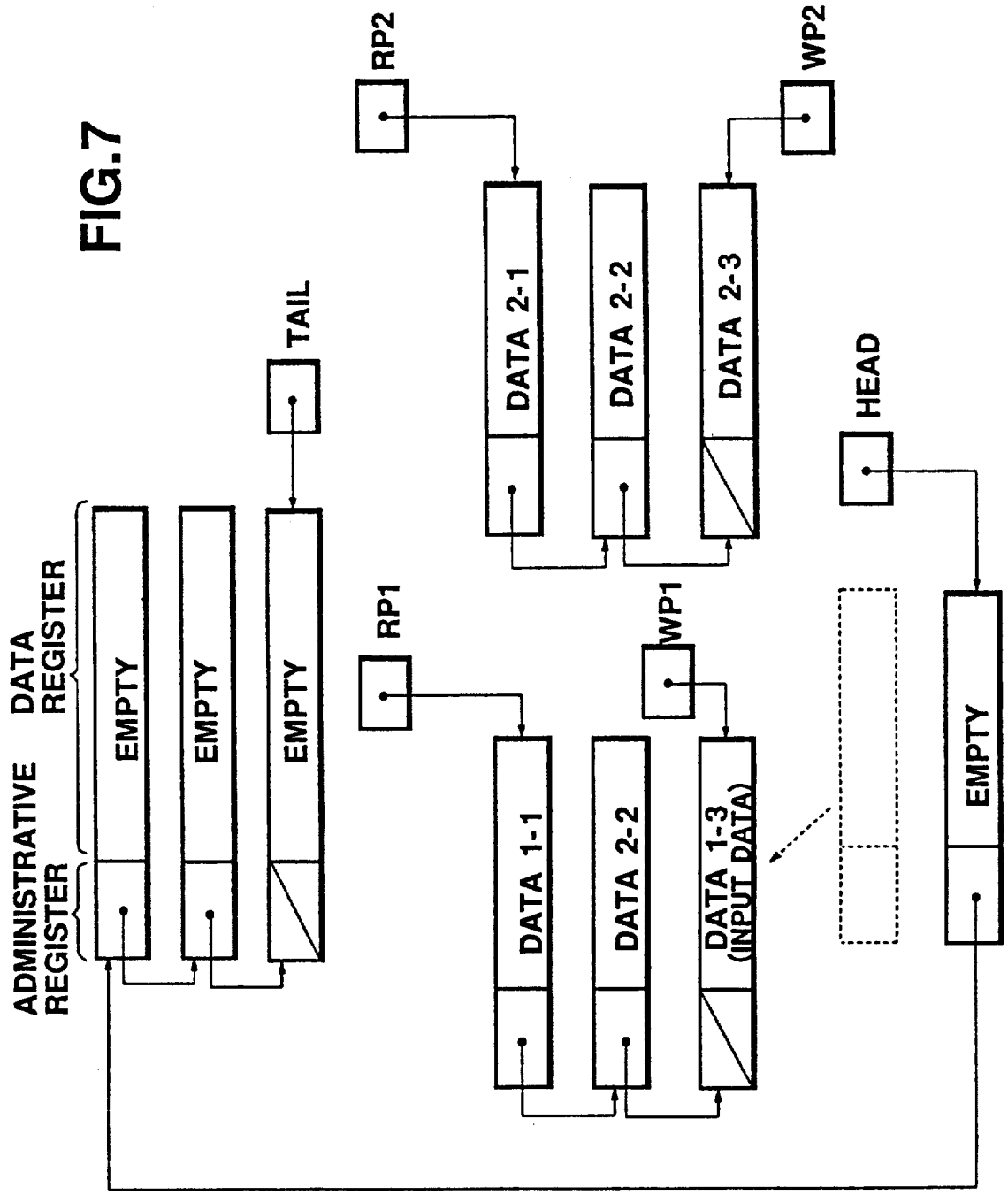
FIG. 7 is a diagram showing imaginary FIFO queues, empty data registers, and pointer chains in the buffer device of FIG. 1 for explaining the result of the input of new data explained in FIG. 6.

As a result, the state of the buffer device now becomes as shown in FIG. 7.

There are two special cases which require somewhat different operations in carrying out the input of the input data.

Figure 8:
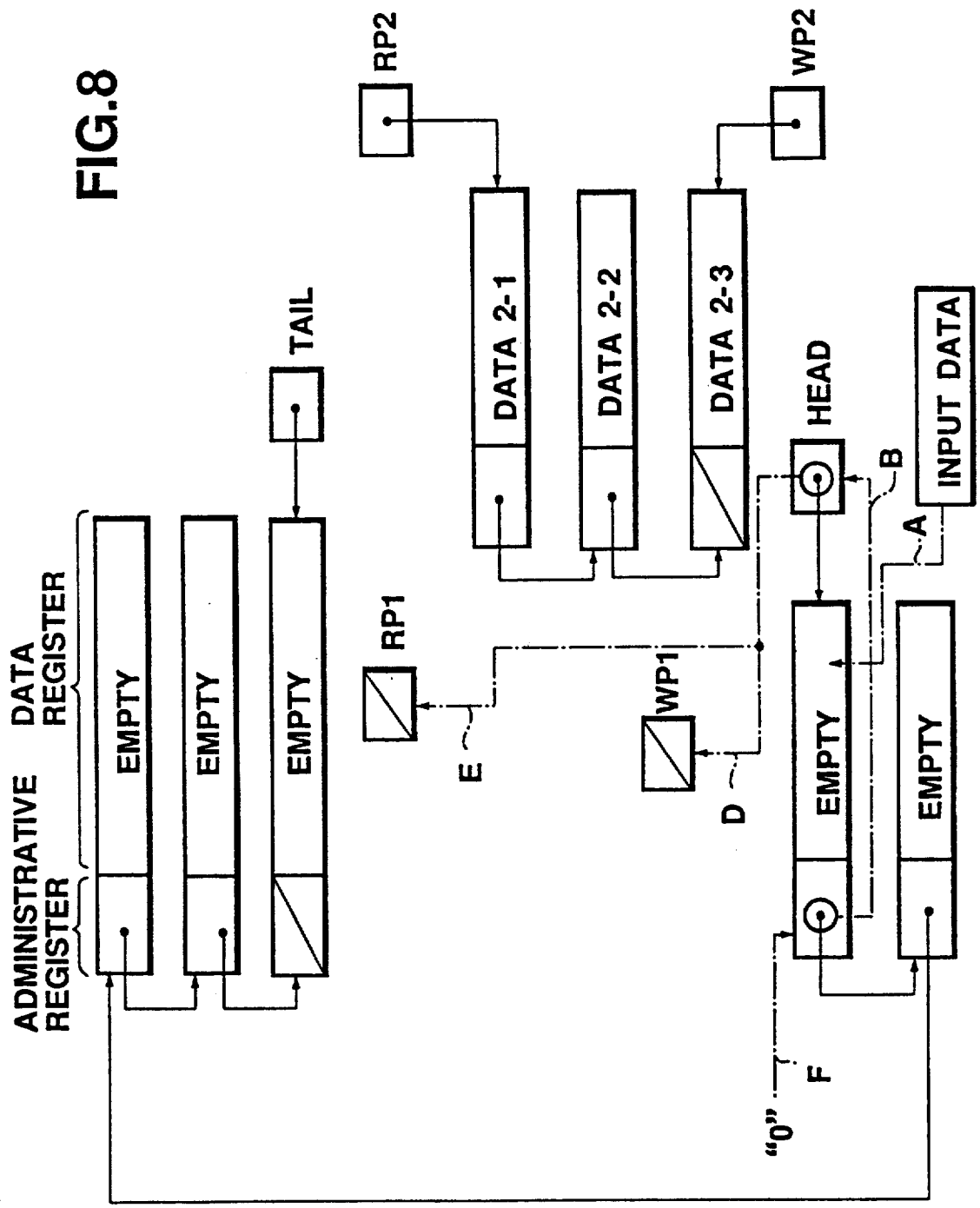
FIG. 8 is a diagram showing imaginary FIFO queues, empty data registers, and pointer chains in the buffer device of FIG. 1 for explaining their functions in the input of new data for one special case.

One of such cases is that in which the imaginary FIFO queue for a particular priority level has no entry, so that both of the write-in address register and read-out address register for that imaginary FIFO queue stores the address consisting of binary zeros alone, as shown in FIG. 8. This situation will be detected by the buffer status indicator 19 which produces the buffer empty signal for that particular priority level in response.

Figure 9:
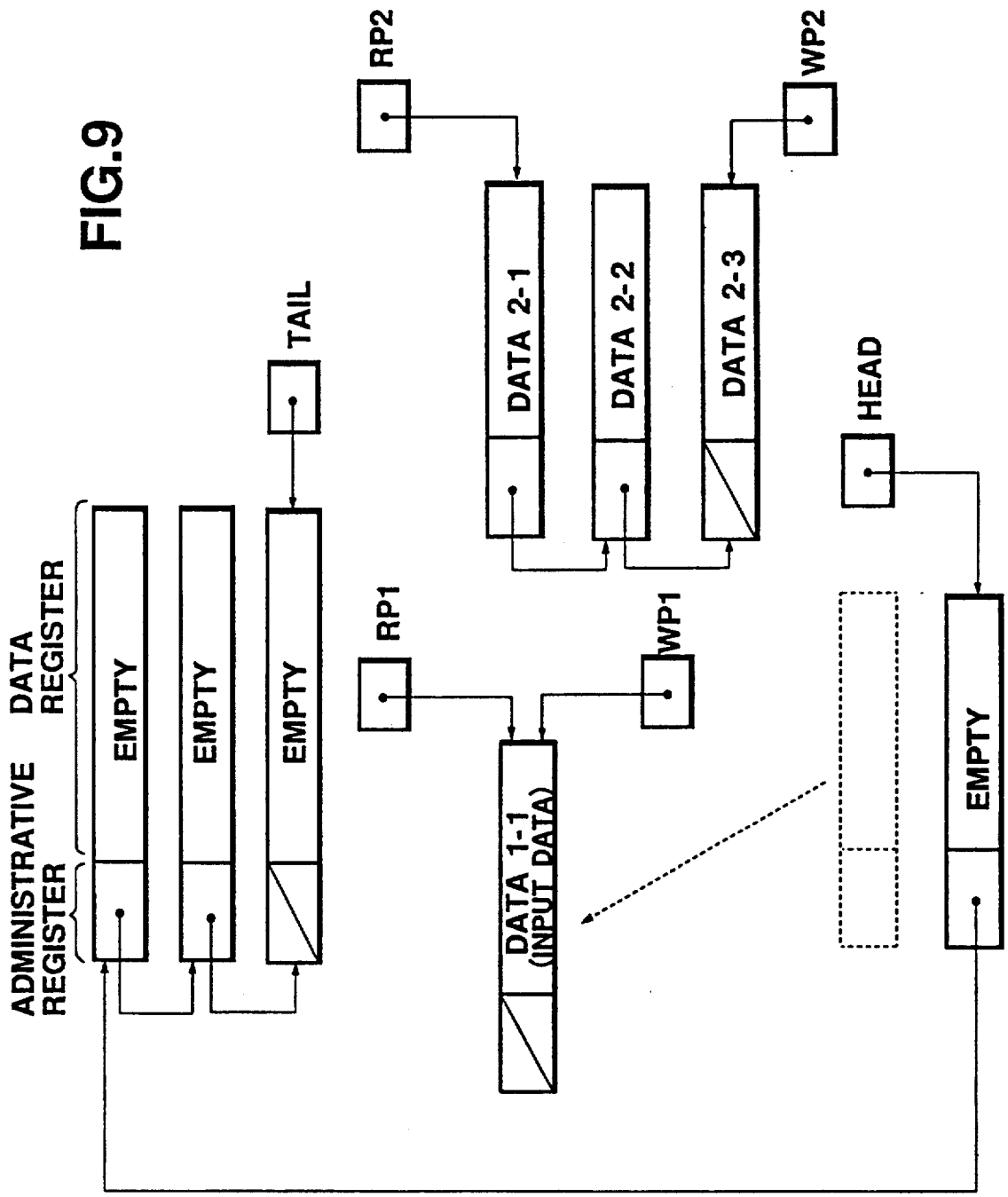
FIG. 9 is a diagram showing imaginary FIFO queues, empty data registers, and pointer chains in the buffer device of FIG. 1 for explaining the result of the input of new data explained in FIG. 8.

In this case, the procedure for the input of the input data differs from that described above with FIG. 6 at the step indicated by a chain line D. Namely, in this case there is no administrative register pointed by that write-in address register WP1 to transfer the original address stored in the empty address register head HEAD to. Thus, in this case, the original address stored in the empty address register head HEAD is transferred to the write-in address register WP1 which is selected in accordance with the priority level of the input data, as indicated by a chain line D in FIG. 8, as well as to the read-out address register RP1 of the same imaginary FIFO queue, as indicated by a chain line E in FIG. 8, so that after this input of the input data both the write-in address register WP1 and the read-out address register RP1 point to the same data register to which the new input data has been entered, as shown in FIG. 9.

Figure 10:
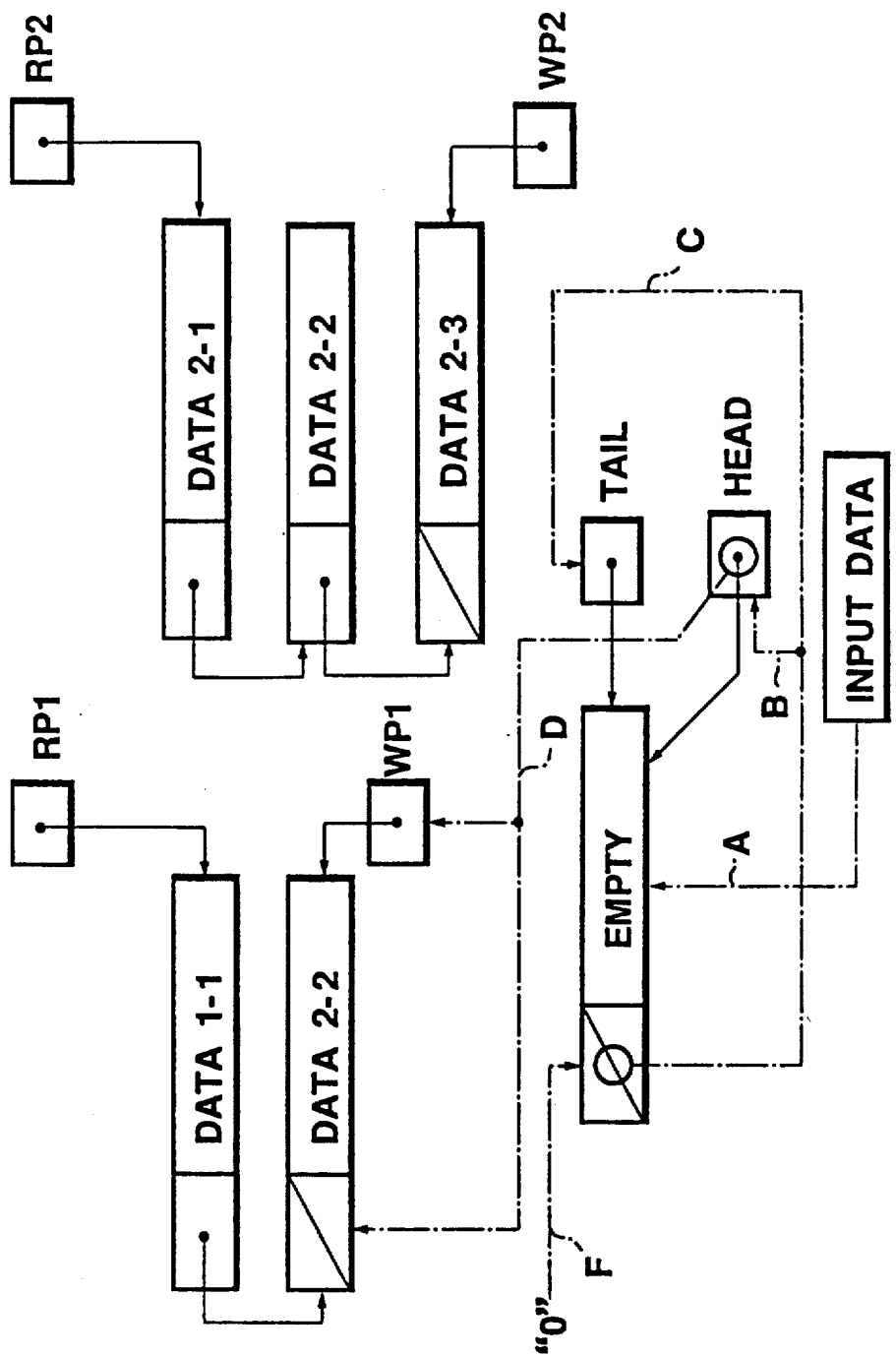
FIG. 10 is a diagram showing imaginary FIFO queues, empty data registers, and pointer chains in the buffer device of FIG. 1 for explaining their functions in the input of new data for another special case.

Another case calling for the special operation is that in which all the data registers are filled up as a result of this input of the new input data, as shown in FIG. 10.

Figure 11:
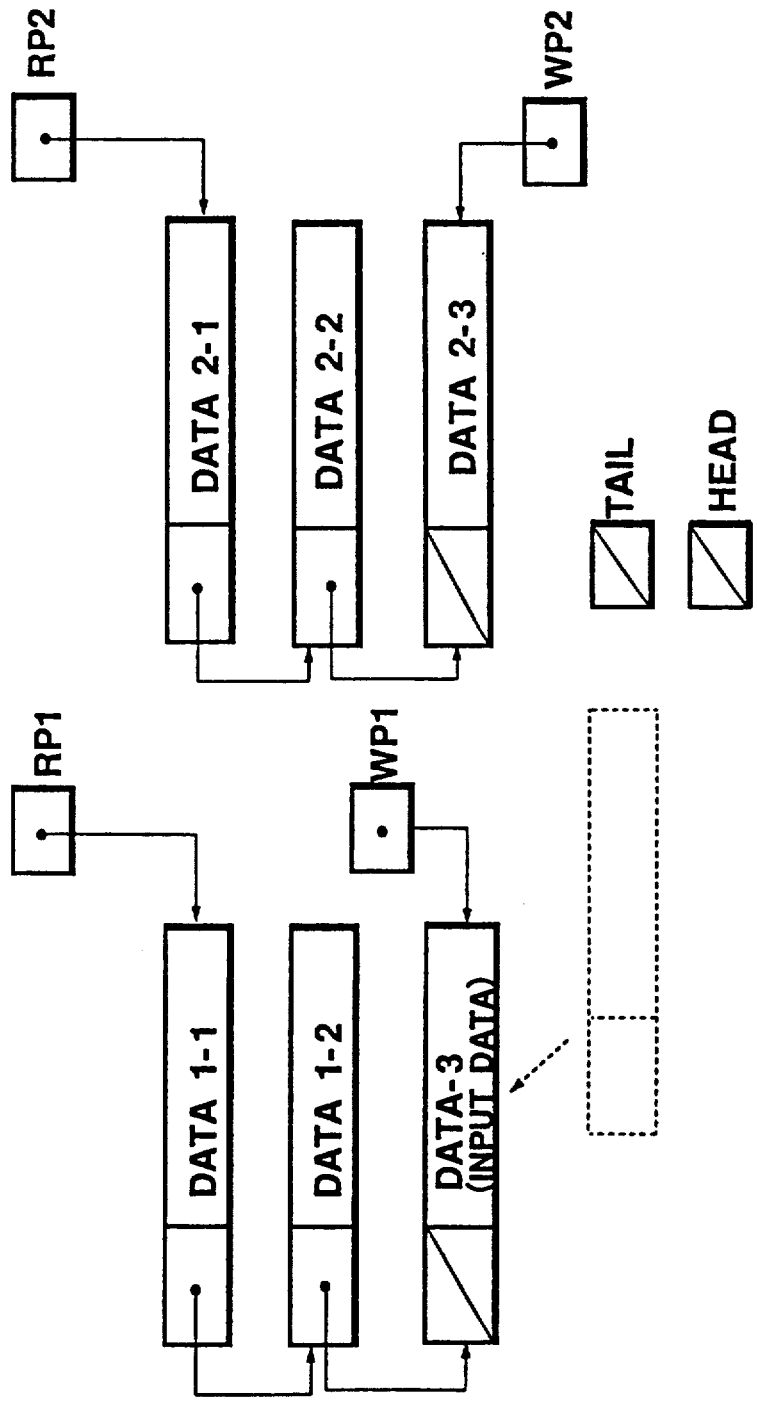
FIG. 11 is a diagram showing imaginary FIFO queues, empty data registers, and pointer chains in the buffer device of FIG. 1 for explaining the result of the input of new data explained in FIG. 10.

In this case, the procedure for the input of the input data differs from that described above with FIG. 6 at the step indicated by a chain line B. Namely, in this case the address stored in the administrative register associated with that data register to which the new input data has been entered is transferred not only to the empty address register head HEAD, as indicated by a chain line B in FIG. 10, but also to the empty address register tail TAIL, as indicated by a chain line C in FIG. 10, so that after this input of the input data both the empty address register head HEAD and empty address register tail TAIL have the address consisting of binary zeros alone, as shown in FIG. 11. This will subsequently be detected by the buffer status indicator 19 which produces the buffer full signal in response.

Figure 12:
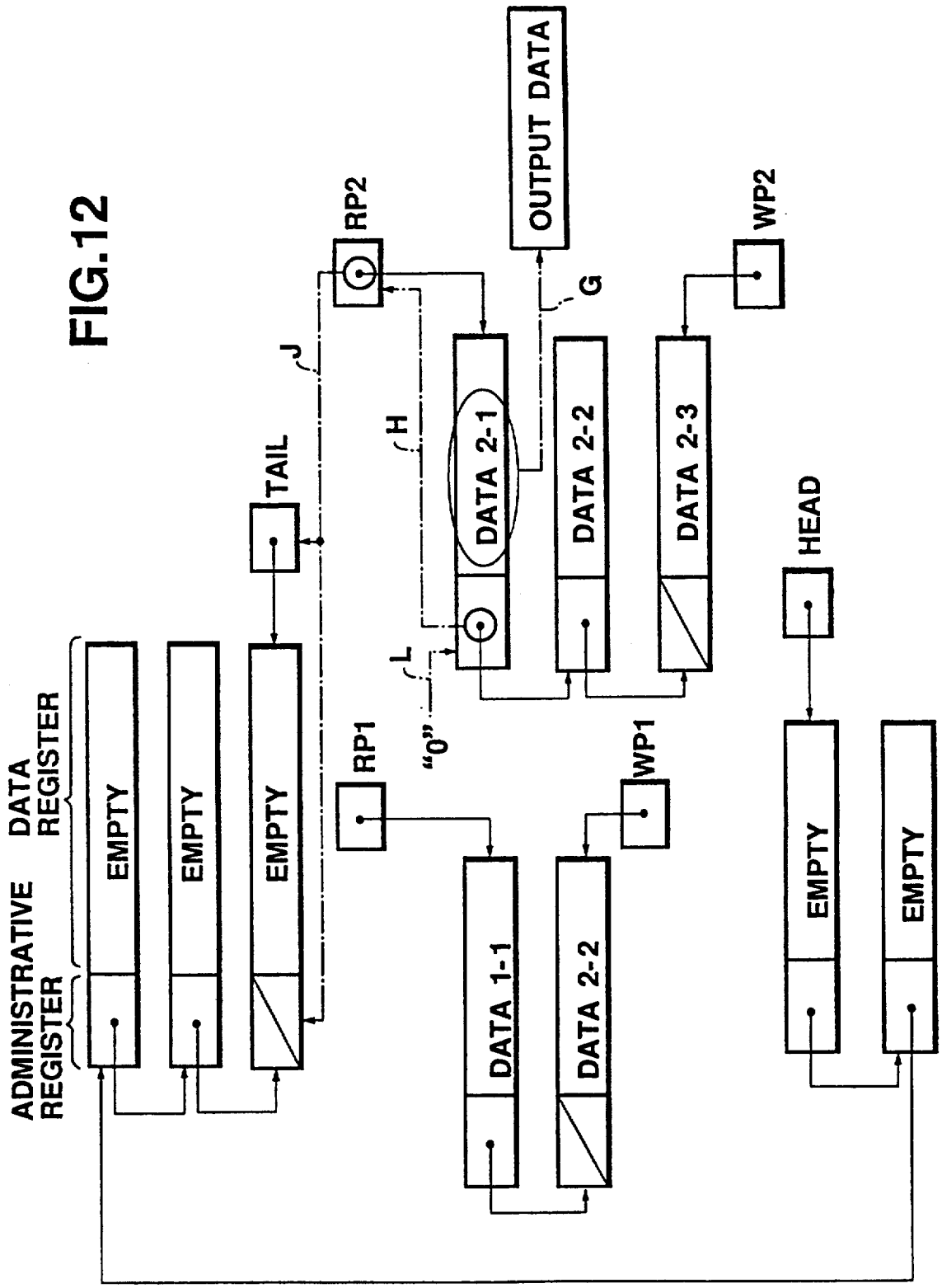
FIG. 12 is a diagram showing imaginary FIFO queues, empty data registers, and pointer chains in the buffer device of FIG. 1 for explaining their functions in the output of data for a general case.

FIG. 12 shows a situation of the output of an output data from the state of FIG. 5, which is done in the following sequence.

First, the data stored in the data register pointed by the read-out address register RP2, which is selected in accordance with the externally given priority level of the output data, is taken out as the output data, as indicated by a chain line G in FIG. 12.

Then, the address stored in the administrative register associated with that data register from which the data has been taken is transferred to that read-out address register RP2 which has been selected, as indicated by a chain line H in FIG. 12.

Meanwhile, the original address stored in the read-out address register RP2 is transferred to the empty address register tail TAIL, as well as to the administrative register pointed by that empty address register tail TAIL, as indicated by a chain line J in FIG. 12.

Finally, the address consisting of binary zeros alone is entered into the administrative register associated with the data register from which the output data has been taken, as indicated by a chain line L in FIG. 12, so that this pair of the administrative register and data register becomes the end of the pointer chain for the empty data registers.

Figure 13:
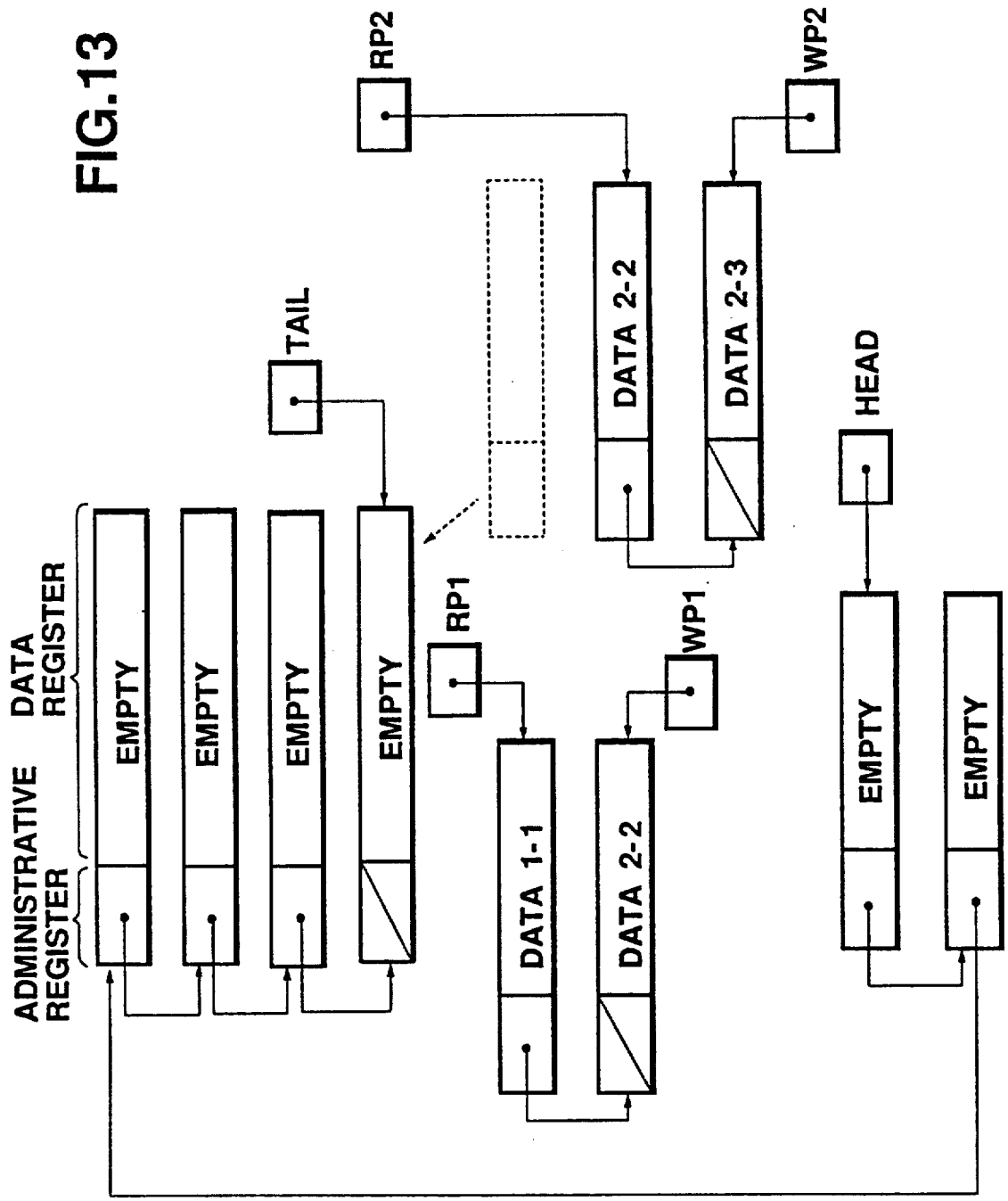
FIG. 13 is a diagram showing imaginary FIFO queues, empty data registers, and pointer chains in the buffer device of FIG. 1 for explaining the result of the output of data explained in FIG. 12.

As a result, the state of the buffer device now becomes as shown in FIG. 13.

There are two special cases which require somewhat different operations in carrying out the output of the output data.

Figure 14:
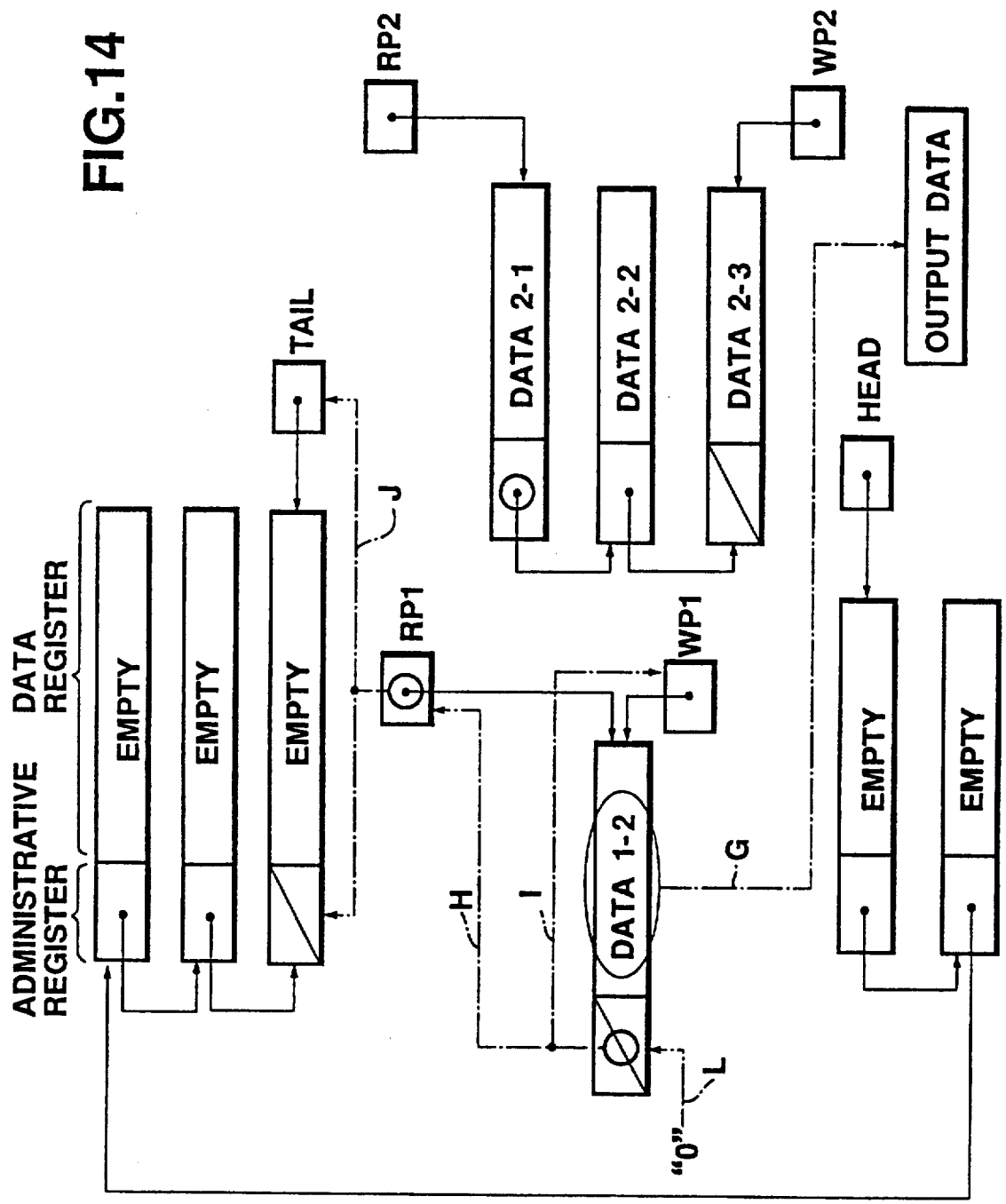
FIG. 14 is a diagram showing imaginary FIFO queues, empty data registers, and pointer chains in the buffer device of FIG. 1 for explaining their functions in the output of data for one special case.

One of such cases is that in which the imaginary FIFO queue for a particular priority level becomes empty as a result of this output of the output data, as shown in FIG. 14.

Figure 15:
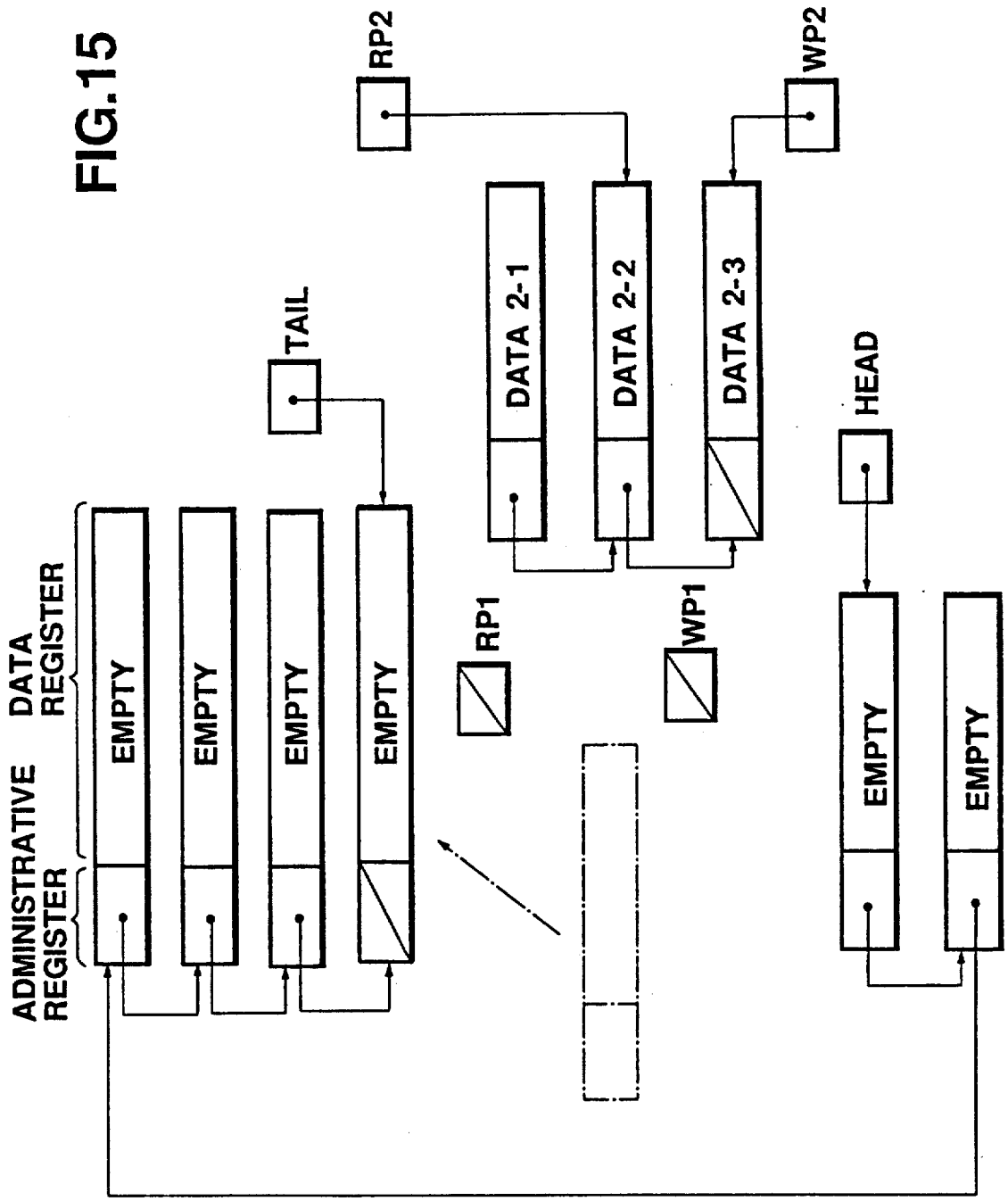
FIG. 15 is a diagram showing imaginary FIFO queues, empty data registers, and pointer chains in the buffer device of FIG. 1 for explaining the result of the output of data explained in FIG. 14.

In this case, the procedure for the output of the output data differs from that described above with FIG. 14 at the step indicated by a chain line H. Namely, in this case the address stored in the administrative register associated with that data register from which the output data has been taken is transferred not only to the read-out address register RP1 for that imaginary FIFO queue of that particular priority level, as indicated by a chain line H in FIG. 14, but also to the write-in address register WP1 of the same imaginary FIFO queue, as indicated by a chain line I in FIG. 14, so that after this output of the output data both the read-out address register RP1 and write-in address register WP1 have the address consisting of binary zeros alone, as shown in FIG. 15. This will subsequently be detected by the buffer status indicator 19 which produces the buffer empty signal for that particular priority level in response.

Figure 16:
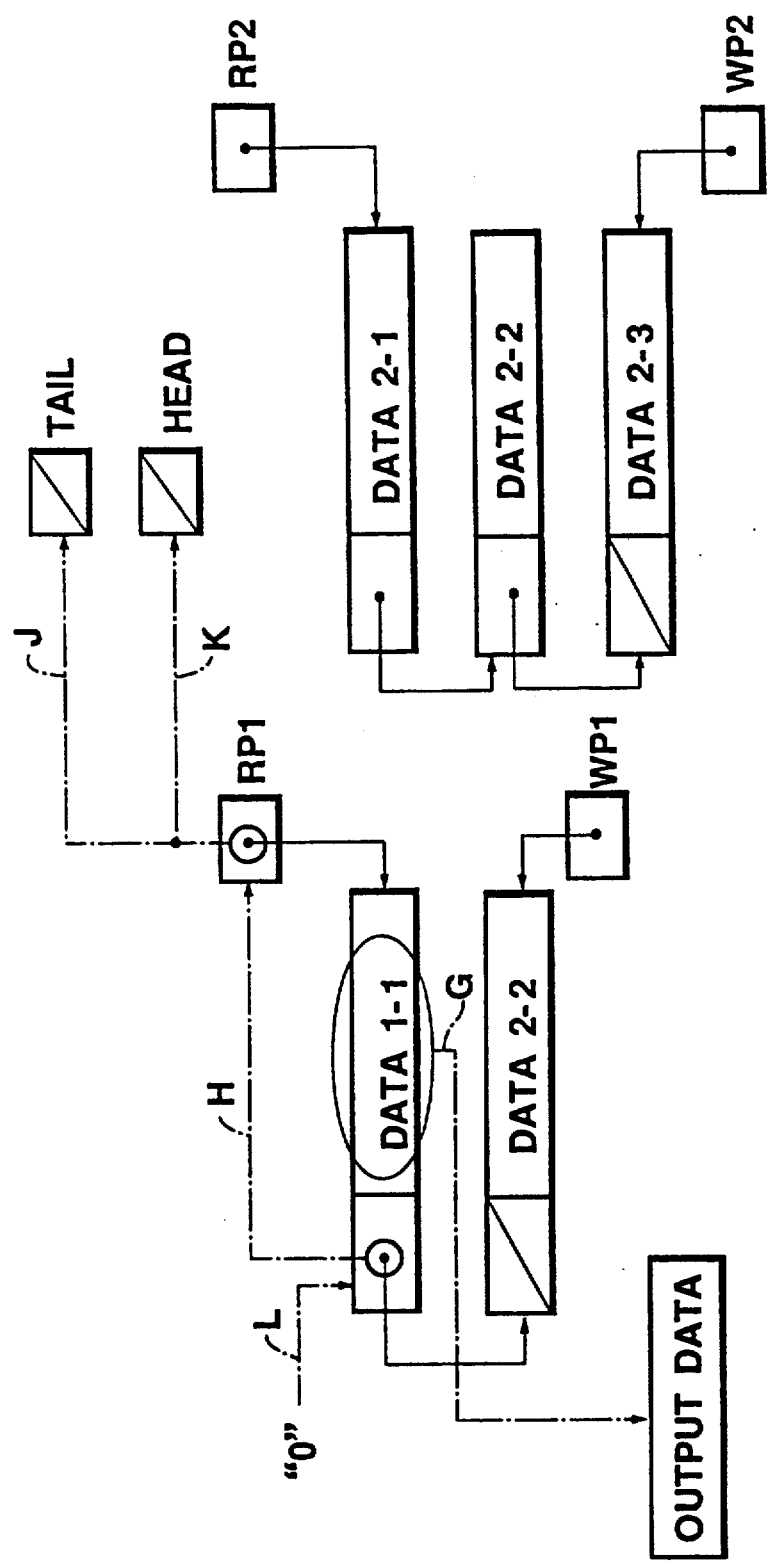
FIG. 16 is a diagram showing imaginary FIFO queues, empty data registers, and pointer chains in the buffer device of FIG. 1 for explaining their functions in the output of data for another special case.

Another case calling for the special operation is that in which all the data registers are filled up before this output of the output data such that both of the empty address register head HEAD and empty address register tail TAIL stores the address consisting of binary zeros alone, as shown in FIG. 16. This situation will be detected by the buffer status indicator 19 which produces the buffer full signal in response.

Figure 17:
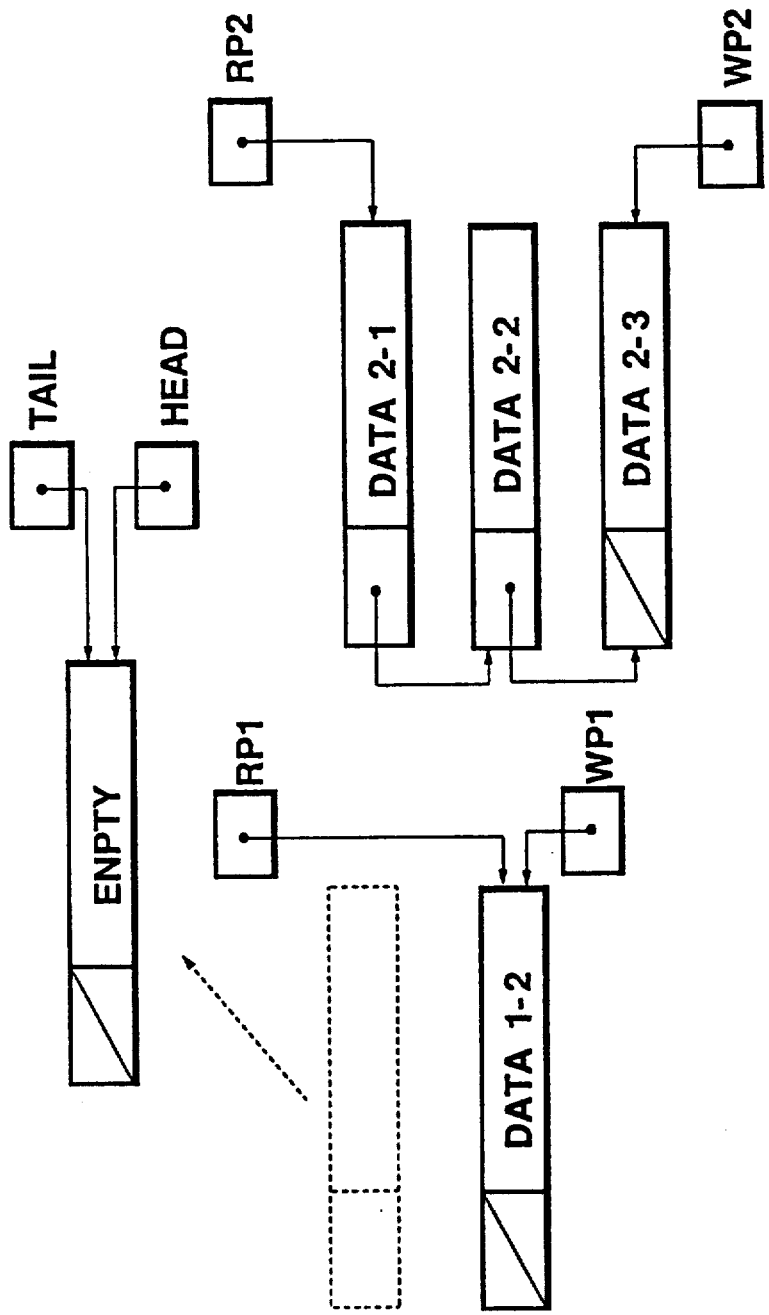
FIG. 17 is a diagram showing imaginary FIFO queues, empty data registers, and pointer chains in the buffer device of FIG. 1 for explaining the result of the output of data explained in FIG. 16.

In this case, the procedure for the output of the output data differs from that described above with FIG. 16 at the step indicated by a chain line J. Namely, in this case there is no administrative register pointed by that empty address register tail TAIL to transfer the original address stored in the read-out address register RP2 to. Thus, in this case, the original address stored in the read-out address register RP2 is transferred to the empty address register tail TAIL, as indicated by a chain line J in FIG. 16, as well as to the empty address register head HEAD, as indicated by a chain line K in FIG. 16, so that after this output of the output data both the empty address register head HEAD and the empty address register tail TAIL point to the same data register from which the output data has been taken, as shown in FIG. 17.

Figure 18:
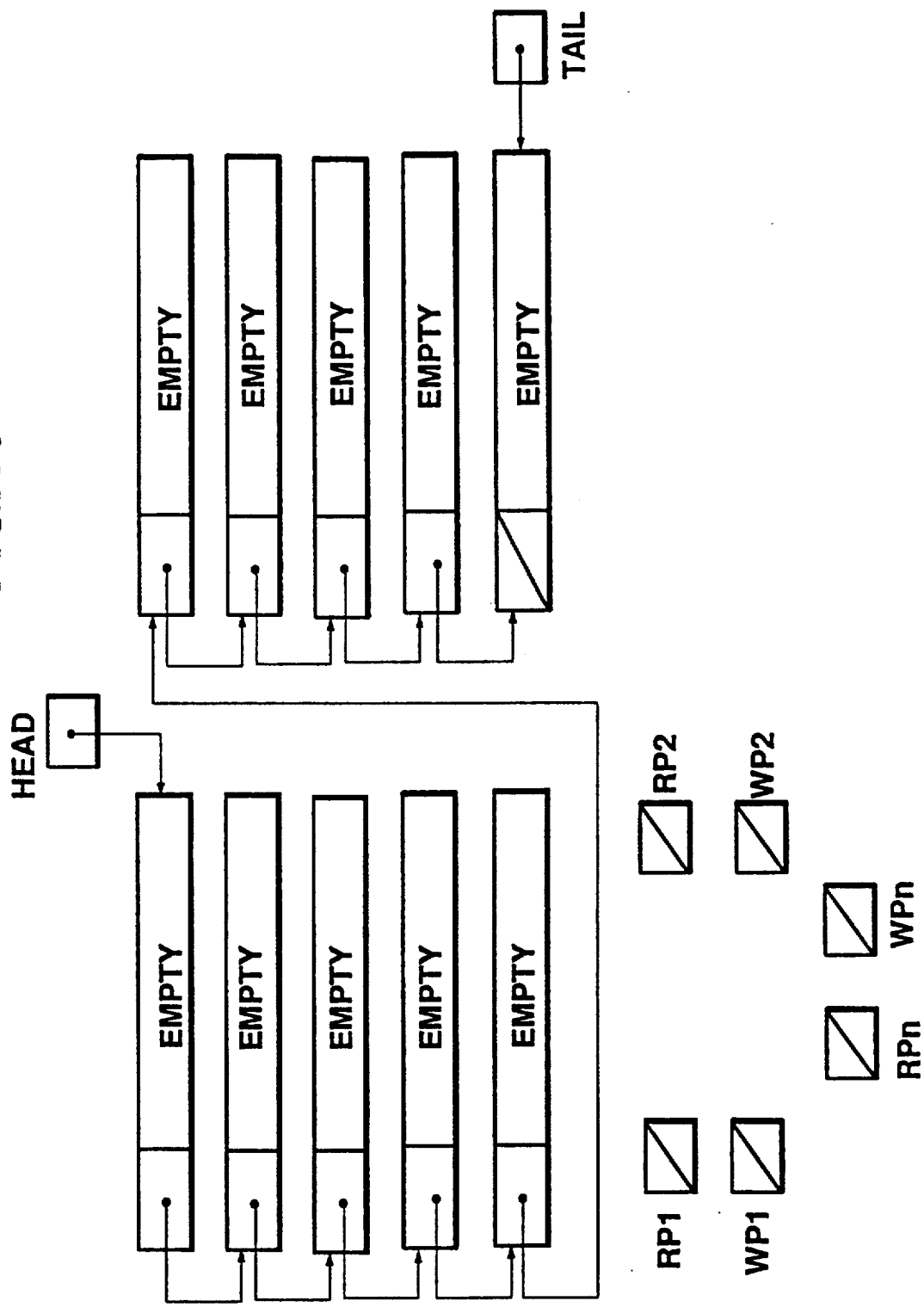
FIG. 18 is a diagram showing imaginary FIFO queues, empty data registers, and pointer chains in the buffer device of FIG. 1 for explaining their functions when no data is stored in the buffer device.

FIG. 18 shows a state of the buffer device in which all the data registers are empty. In this case, all pairs of the data registers and the administrative registers are joined by a pointer chain starting from the empty address register head HEAD and ending at the empty address register tail TAIL, while the read-out address registers RP1 and RP2, as well as the write-in address registers WP1 and WP2 store the address consisting of binary zeros alone.

It is to be noted that in these operations of input and output explained above, the various steps involved can be carried out simultaneously, since the administrative register array 11 has a two port RAM structure involving the write-in port 11a and read-out port 11b which can be operated independently. Therefore, this buffer device is suitable for a high speed buffer implementation.

When this buffer device is applied to the packet exchange system or communication system using ATM, the data to be stored in the data register array 10 will be the packets or cells, respectively.

In such a case, the priority levels may designate the direction of transmission of the packets or cells such that the buffer device can be viewed as a packet switch or a cell switch. Moreover, in a communication system with ATM, when a plurality of input paths to the buffer device are provided and the directions of cells are taken for the priority levels, this buffer device can function as a type of a cell switch known as a shared buffering cell switch.

As explained, it is possible to provide a buffer device capable of dealing with multiple priority levels in which the efficiency of the memory capacity utilization can be improved such that the priority levels can be handled at the higher efficiency with smaller memory capacities, and which is adaptable to a high speed buffer implementation, because each of the imaginary FIFO queues corresponding to different priority levels has flexible memory capacity, so that even when the data for a particular priority level are more numerous than those for the other priority data, a memory capacities of the entire buffer structure will be utilized at high efficiency, and the procedure for controlling the imaginary FIFO queues can be executed in parallel.

Besides those already mentioned above, many modifications and variations of the above embodiments may be made without departing from the novel and advantageous features of the present invention. Accordingly, all such modifications and variations are intended to be included within the scope of the appended claims.

What is claimed is:

1. A buffer device for receiving, temporarily storing and transmitting data accompanied by information indicating a priority level of the data, where there is at least two distinct priority levels, the device comprising:

data register array including a plurality of data register means for temporarily storing the data, the data register means being divided into empty data register means storing no data and as many number of imaginary FIFO queues as a number of distinct priority levels, each imaginary FIFO queue being corresponding to each distinct priority level, and a number of data register means in each imaginary FIFO queue being flexible;

administrative register array comprised of a two port RAM means for modifiably storing the administrative information containing pointer chains specifying the imaginary FIFO queues in the data register array, having a write-in port through which the administrative information can be written into the administrative register array and a read-out port through which the administrative information can be read out from the administrative register array which are independently operable;

data input means for receiving new data, entering the new data into one empty data register means, and modifying the pointer chain specifying the imaginary FIFO queue corresponding to a priority level of the new data indicated by the information accompanying the new data, such that the pointer chain is extended to include that one empty data register means into which the new data is entered at an end of that imaginary FIFO queue; and data output means for taking out data stored in one data register means, transmitting the data, and modifying the pointer chain specifying the imaginary FIFO queue corresponding to a priority level of that data, such that the pointer chain is shortened to exclude that one data register means from which the data is taken from a top of that imaginary FIFO queue.

2. The buffer device of claim 1, wherein the data input means and the data output means utilize, in modifying the pointer chain, write-in address register means, provided in correspondence with the imaginary FIFO queues, for indicating the top of each imaginary FIFO queue, and readout address register means, provided in correspondence with the imaginary FIFO queues, for indicating the end of each imaginary FIFO queue.

3. The buffer device of claim 1, wherein the empty data registers means are also specified by a pointer chain stored in the administrative register array, and wherein the data input means and the data output means utilize, in modifying the pointer chain, empty address register head means for indicating a top of the pointer chain for the empty data register means, and empty address register tail means for indicating an end of the pointer chain for the empty data register means.

4. The buffer device of claim 1, wherein the priority levels represents directions of the data.

* * * * *